US010854235B2

(12) United States Patent
Tanaka

(10) Patent No.: US 10,854,235 B2
(45) Date of Patent: Dec. 1, 2020

(54) ELECTRODE INCLUDING A CONTINUOUSLY SMOOTH CHANNEL

(71) Applicant: Seagate Technology LLC, Cupertino, CA (US)

(72) Inventor: Samuel Lewis Tanaka, San Leandro, CA (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 185 days.

(21) Appl. No.: 15/853,286

(22) Filed: Dec. 22, 2017

(65) Prior Publication Data

US 2019/0198052 A1 Jun. 27, 2019

(51) Int. Cl.
*G11B 5/84* (2006.01)
*B33Y 10/00* (2015.01)
*B33Y 80/00* (2015.01)
*B29C 64/153* (2017.01)
*G11B 5/00* (2006.01)

(52) U.S. Cl.
CPC .............. *G11B 5/84* (2013.01); *B29C 64/153* (2017.08); *B33Y 10/00* (2014.12); *B33Y 80/00* (2014.12); *G11B 2005/0021* (2013.01)

(58) Field of Classification Search
CPC ...... G11B 5/84–865; G11B 2005/0021; B33Y 80/00; B33Y 10/00; B29C 64/153
See application file for complete search history.

(56) References Cited

U.S. PATENT DOCUMENTS

| | | | |
|---|---|---|---|
| 3,610,796 A * | 10/1971 | DeCorso | F27D 11/08 373/90 |
| 6,435,868 B2 | 8/2002 | White et al. | |
| 6,656,409 B1 * | 12/2003 | Keicher | B23P 15/246 219/121.66 |
| 8,701,753 B2 | 4/2014 | Yi et al. | |
| 2019/0066985 A1 * | 2/2019 | Hirose | H01J 37/32715 |

* cited by examiner

Primary Examiner — Scott R. Walshon
Assistant Examiner — Jasper Saberi
(74) Attorney, Agent, or Firm — Holzer Patel Drennan

(57) ABSTRACT

An apparatus includes an electrode and a first channel segment within the electrode. A second channel segment is within the electrode, wherein the second channel segment is parallel to the first channel segment. A third channel segment is within the electrode. The third channel segment connects the first channel segment and the second channel segment, and the third channel segment includes a continuously smooth radial bend. A heating element is attached to the electrode.

21 Claims, 5 Drawing Sheets

ELECTRODE INCLUDING A CONTINUOUSLY SMOOTH CHANNEL

SUMMARY

Provided herein is an electrode and a first channel segment within the electrode. A second channel segment is within the electrode, wherein the second channel segment is parallel to the first channel segment. A third channel segment is within the electrode. The third channel segment connects the first channel segment and the second channel segment, and the third channel segment includes a continuously smooth radial bend. A heating element is attached to the electrode.

DESCRIPTION

Figure 1:
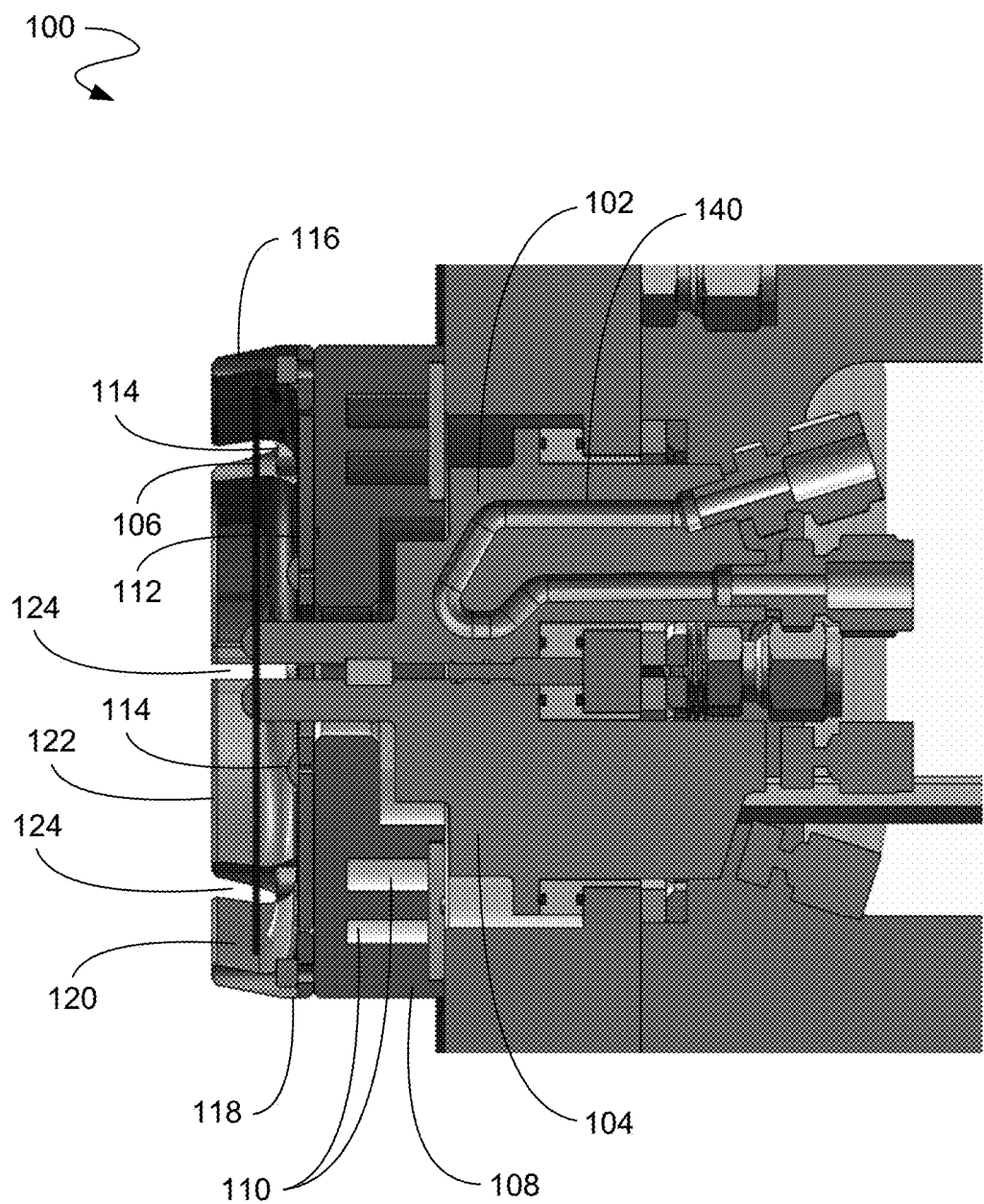
FIG. 1 shows a cross section of a heater according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

A disk drive media manufacturing process may include a carrier that moves a workpiece between stations. As the workpiece moves through the stations on the carrier, the workpiece may move in and out of chambers in which a number of processes form various layers on the workpiece. Some non-limiting examples of the processes may include heating, sputtering, and cooling the workpiece.

When forming heat assisted magnetic recording (hereinafter, "HAMR") media, a workpiece may need to be heated prior to further processing. For example, a substrate may need to be quickly heated (e.g. within 5 seconds or less) on both sides to temperatures 400 degrees Celsius or more. Therefore, in various embodiments described herein the carrier moves a substrate into a position between two heaters. The heaters include elements to increase the efficiency and speed of the heating. For example, the heaters include elements that reflect and focus emissions from the heating elements towards the substrate. As a result, the substrate is heated very quickly on both sides. After the heating, the carrier moves the substrate to the next station for further processing (e.g. sputtering).

One of the elements in the heater is an electrode. During the heating operation, the electrode may overheat, suffer heat related damage, and/or melt. Therefore, embodiments described herein include a high conductance water flow channel through the electrode. The water channel includes smooth radial curved features. Such smooth radial curved features cannot be formed with traditional machining which only allows for straight water channels that intersect at hard angles to each other. Therefore, embodiments described herein are able to achieve such design features by utilizing 3D direct metal printing in order to make smooth and complex internal flow channels with radial turns that allow for significantly higher flow rates.

Referring now to FIG. 1, a cross section of a heater 100 is shown according to one aspect of the present embodiments. The heater 100 may include one or more electrodes (e.g. first electrode 102 and second electrode 104) physically and electrically attached to a heating element 106 (e.g. high temperature graphite element). In some embodiments, the electrodes 102, 104 cause the heating element 106 to heat to temperatures over 2000 degrees Celsius. Emissions from the heating element 106 travel in all directions.

In order to protect the heater 100, a heat sink 108 is positioned between the electrodes 102, 104 and the heating element 106. In various embodiments, the heat sink 108 may include one or more high flow water channels 110. For example, the high flow water channels 110 may be capable of flow rates of 10 liters per minute or greater. However, emissions from the heating element 106 that are removed by the heat sink 108 reduce efficiency of the heater 100. Therefore, embodiments described herein include elements for reflecting the emissions away from the heater 100 (e.g. away from the heat sink 108).

In order to increase the efficiency of the heater 100, various embodiments include a back plane mirror 112 mounted on the heat sink 108 and positioned between the heat sink 108 and the heating element 106. The back plane mirror 112 is a reflector that reflects emissions from the heating element 106 away from the heater 100 and the heat sink 108. As such, heat removed by the heat sink 108 is greatly reduced by the back plane mirror 112, thereby increasing the efficiency of the heater 100. In order to withstand the heat generated by the heating element 106, some embodiments use a heat resistant mirror (e.g. a molybdenum mirror). In addition, in order to improve efficiency some embodiments use a highly polished mirror, wherein a surface roughness of the mirror is 300 angstroms Ra (roughness average) or less.

In the illustrated embodiment, the back plane mirror 112 is annular and may include a diameter of 200 mm or less. However, it is understood that embodiments may include any size and shape back plane mirror 112. For example, the back plane mirror 112 may be a parabolic mirror. Furthermore, more than one back plane mirror may be mounted to the heat sink 108. For example, two half circle back plane mirrors may be combined to form a complete circle. Therefore, any number and shape of back plane mirrors may be simultaneously mounted.

The back plane mirror 112 may be removably secured to the heat sink 108 with fasteners 114 (e.g. screw, bolt, press fit rivet, tie, etc.). As such, various diameters of the back plane mirror 112 may be interchangeable for various heating requirements. For example, a 200 mm diameter back plane mirror may be replaced with a 100 mm diameter back plane mirror in order to meet a desired efficiency and/or substrate size. In addition, the back plane mirror 112 may be replaced with a newly polished back plane mirror. For example, the back plane mirror 112 may dull/tarnish and loose reflectivity as it is used. Therefore, the back plane mirror 112 may be replaced with a fresh back plane mirror in order to minimize downtime of the heater 100. The back plane mirror 112 may be repolished or discarded after removal. The fasteners 114 include materials to resist the high temperatures generated by the heating element 106. For example, in some embodiments the fasteners 114 may be molybdenum fasteners.

In various embodiments, the efficiency of the heater 100 is also increased with an aperture reflector 116 mounted on the heat sink 108. The aperture reflector 116 surrounds the back plane mirror 112 (e.g. the reflector) and the heating element 106. In some embodiments, the aperture reflector 116 is a cone shape that extends away from the heating element 106. As such, the aperture reflector 116 narrows as it extends further from the heating element 106. It is understood that the cone shape is non-limiting, and further embodiments may use any shape, including broadening (e.g. opposite of narrowing) shapes and continuous (e.g. neither narrowing nor broadening) shapes.

The aperture reflector 116 includes a base 118 surrounding the back plane mirror 112. As such, the diameter of the base 118 is larger than the back plane mirror 112. The aperture reflector 116 also includes a reflective sidewall 120 facing the heating element 106. The reflective sidewall 120 prevents emissions from escaping from the sides of the heating element 106, and focuses the emissions into a unified direction away from the heating element 106. As such wasted escaped heat is greatly reduced by the aperture reflector 116, thereby increasing the efficiency of the heater 100. In order to withstand the heat generated by the heating element 106, some embodiments use a heat resistant aperture reflector (e.g. a molybdenum aperture reflector). In addition, in order to improve efficiency some embodiments use a highly polished reflective sidewall, wherein a surface roughness of the reflective sidewall is 300 angstroms Ra (roughness average) or less.

In the illustrated embodiment, the reflective sidewall 120 extends away from the base 118 to an opening 122 (e.g. aperture) that is narrower than the back plane mirror 112. For example, the opening 122 may include a diameter less than 200 mm. As such, the opening 122 includes a smaller diameter than the diameter of the back plane mirror 112. As described above, it is understood that the aperture reflector 116 may be any shape, as well as broadening and continuous. Therefore, the sidewall 120 and the opening 122 may also be any shape, as well as broadening and continuous. As such, the opening 122 may include a diameter that is equal to or larger than the diameter of the back plane mirror 112. Furthermore, more than one aperture reflector may be mounted to the heat sink 108. For example, two half circle aperture reflectors may be combined to form a complete circle. Therefore, any number and shape of aperture reflectors may be simultaneously mounted.

The aperture reflector 116 may be removably secured to the heat sink 108 with the fasteners 114 (e.g. screw, bolt, press fit rivet, tie, etc.). As such, various diameters of the aperture reflector 116 may be interchangeable for various heating requirements. For example, an aperture reflector with a 95 mm opening may be replaced with an aperture reflector with a 150 mm or 50 mm opening in order to meet a desired efficiency and/or substrate size. It is understood that aperture reflectors with varying sized bases may also be interchangeably replaced. In addition, the aperture reflector 116 may be replaced with a newly polished aperture reflector. For example, the aperture reflector 116 may dull/tarnish and loose reflectivity as it is used. Therefore, the aperture reflector 116 may be replaced with a fresh aperture reflector in order to minimize downtime of the heater 100. The aperture reflector 116 may be repolished or discarded after removal.

In various embodiments, the aperture reflector 116 may also include gaps 124 that are perpendicular to the back plane mirror 112. Any number of the gaps 124 may be present. The gaps 124 may be positioned to facilitate access to the fasteners 114. In addition, the gaps 124 may be positioned to relieve stress caused by the expansion and/or contraction of the aperture reflector 116 during temperature changes.

In order to protect the first electrode 102 a channel 140 is illustrated extending within the first electrode 102. It is understood that in various embodiments the second electrode 104 may or may not also include a channel. The channel 140 includes a plurality of smooth bends and includes a continuous uniform diameter. The channel 140 is a high flow water/coolant/fluid channel that removes excess heat from the first electrode 102. As such, the first electrode 102 is protected from heat damage that may cause, for example, melting, damage to the electrode(s), and/or damage to one or more of the other components of the heater 100. The channel 140 will be discussed in further detail below with reference to FIGS. 3A and 3B.

Figure 2:
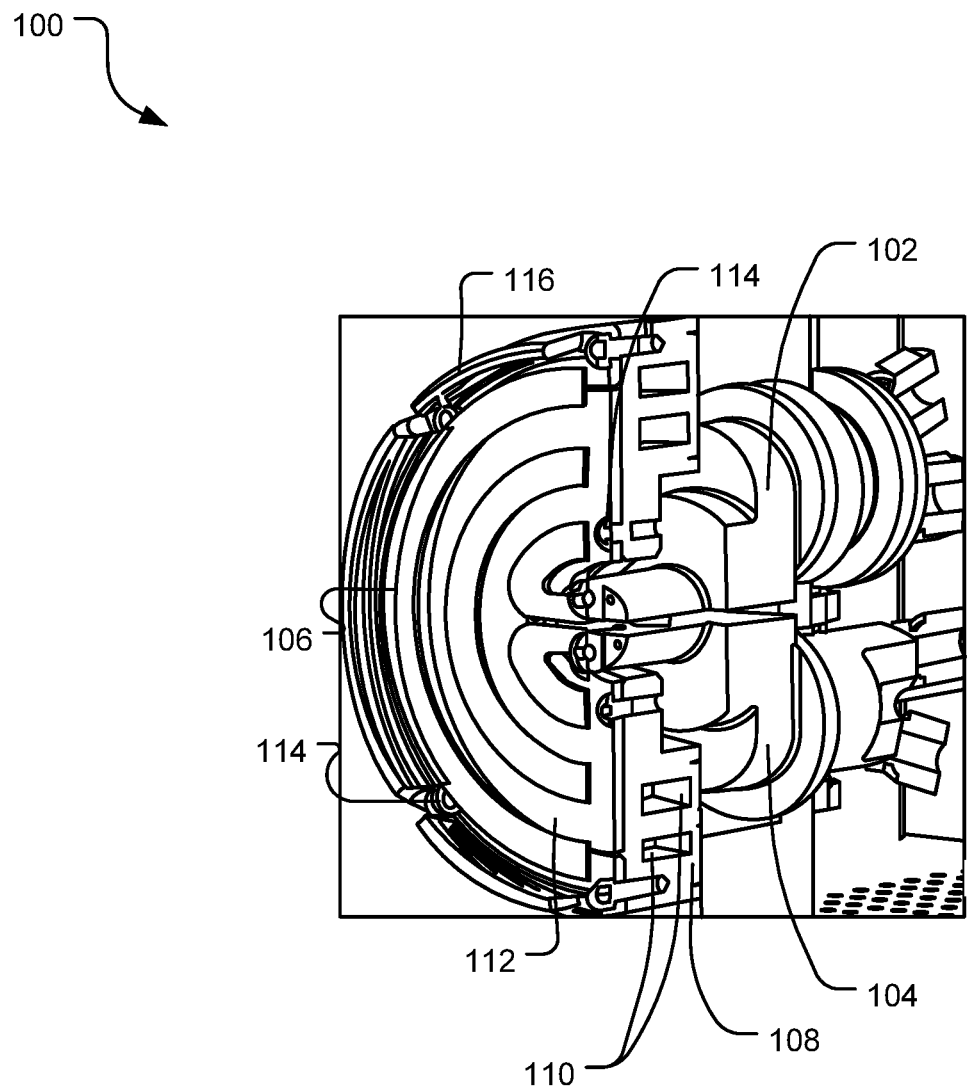
FIG. 2 shows a perspective cross section of the heater according to one aspect of the present embodiments.

Referring now to FIG. 2, a perspective cross section of the heater 100 is shown according to one aspect of the present embodiments. The first electrode 102 and the second electrode 104 are physically and electrically attached to the heating element 106. The heat sink 108 is positioned between the electrodes 102, 104 and the heating element 106. The heat sink 108 includes the high flow water channels 110. The back plane mirror 112 is mounted on the heat sink 108 and positioned between the heat sink 108 and the heating element 106. The back plane mirror 112 is removably secured to the heat sink 108 with the fasteners 114. The aperture reflector 116 is mounted on the heat sink 108, and surrounds the back plane mirror 112 and the heating element 106. The aperture reflector 116 is removably secured to the heat sink 108 with the fasteners 114. The heat sink 108, the back plane mirror 112, and the aperture reflector 116 are electrically isolated from the first electrode 102, the second electrode 104, and the heating element 106.

Figure 3A:
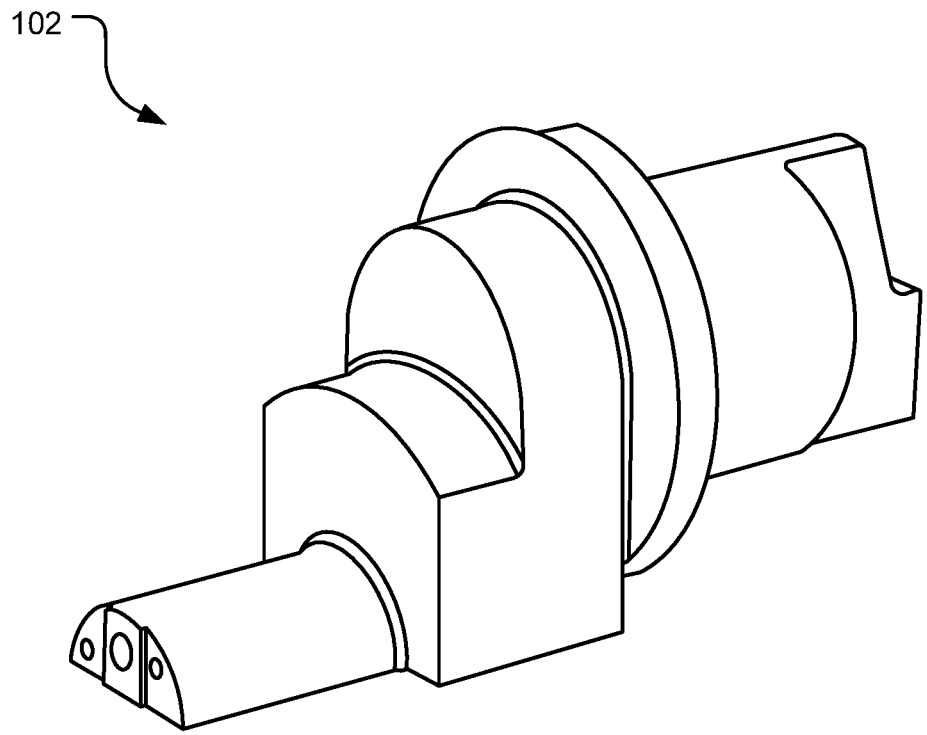
FIGS. 3A and 3B show the first electrode 102 and a cross section of the first electrode 102 showing the channel according to one aspect of the present embodiments.
Figure 3B:
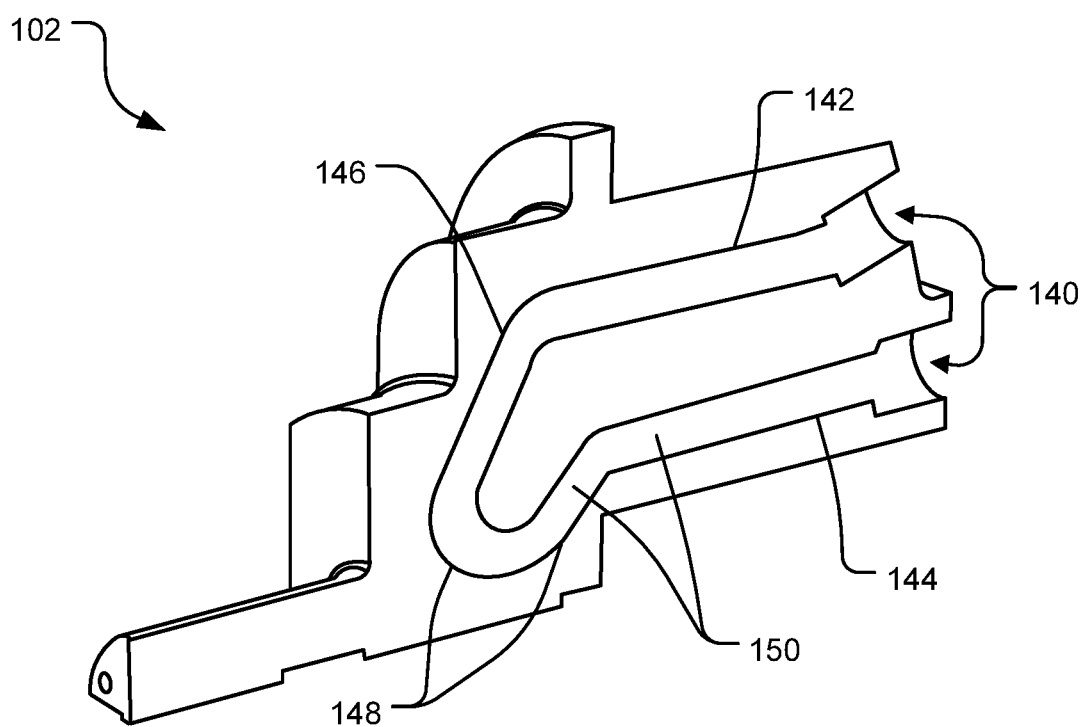

Referring now to FIGS. 3A and 3B, the first electrode 102 and a cross section of the first electrode 102 showing the channel 140 are shown according to one aspect of the present embodiments. In various embodiments, the first electrode 102 conducts at least 50 amps and may be, for example, stainless steel, titanium, or copper (e.g. oxygen free pure copper). Within the first electrode 102, the channel 140 includes a first channel segment 142 and a second channel segment 144 that is parallel to the first channel segment 142. A third channel segment 146 connects the first channel segment 142 and the second channel segment 144. The third channel segment 146 includes one or more bends 148.

The bends 148 are smooth radial curved features. Such smooth radial curved bends 148 cannot be formed with traditional machining which only allows for straight water channels that intersect at hard angles to each other. Alternatively, traditional machining could divide an electrode into multiple segments in order to form a more complex channel design. The multiple segments could then be combined (e.g. welded, glued, screwed, press fitted, etc.) together. However, traditional machining is unable to create such complex channels within a unitary continuous electrode body.

Therefore, embodiments described herein are able to achieve such design features by utilizing 3D direct metal printing in order to make smooth and complex internal flow channels with radial turns that allow for significantly higher flow rates. By utilizing the 3D direct metal printing process such channels are able to be created within a unitary continuous electrode body without multiple parts forming a seam when combined. In embodiments described herein, the 3D printing is capable of achieving material densities up to 99.8% of billet casting, wherein such densities are not possible using techniques such as laser sintering. Therefore, the 3D printed unitary electrode body is able to prevent vacuum leaks on the outside as well as maintain high pressure fluid (e.g. water) inside the channel.

In some embodiments, the first channel segment 142, the second channel segment 144, and the third channel segment 146 include a continuous uniform diameter. In addition, the first channel segment 142, the second channel segment 144, and the third channel segment 146 include a surface 150 that is continuous and smooth. The surface 150 is without a weld or a seam. In various embodiments, the surface roughness of the surface 150 of the first channel segment 142, the second channel segment 144, and the third channel segment 146 is 200-400 micro inches roughness average.

In further embodiments, first channel segment 142, the second channel segment 144, and the third channel segment 146 provide a fluid flow rate of at least 10 liters per minute, wherein the pressure of the fluid is up to 100 pounds per square inch. In some embodiments the first channel segment 142, the second channel segment 144, and the third channel segment 146 (including the bends 148) do not create cavitation of the fluid.

Figure 4A:
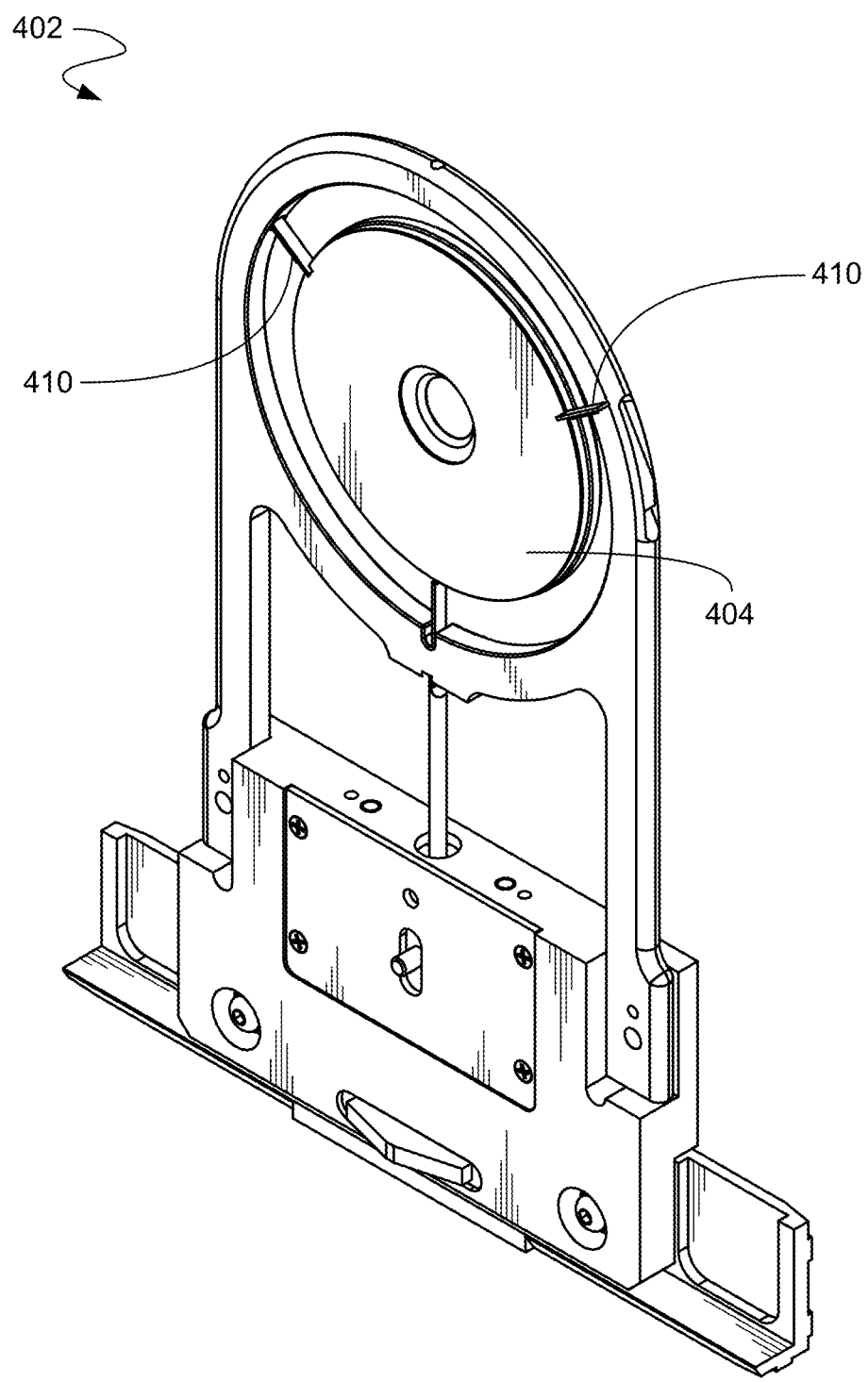
FIGS. 4A and 4B show a system including a carrier for positioning a workpiece between a first heater and a second heater according to one aspect of the present embodiments.
Figure 4B:
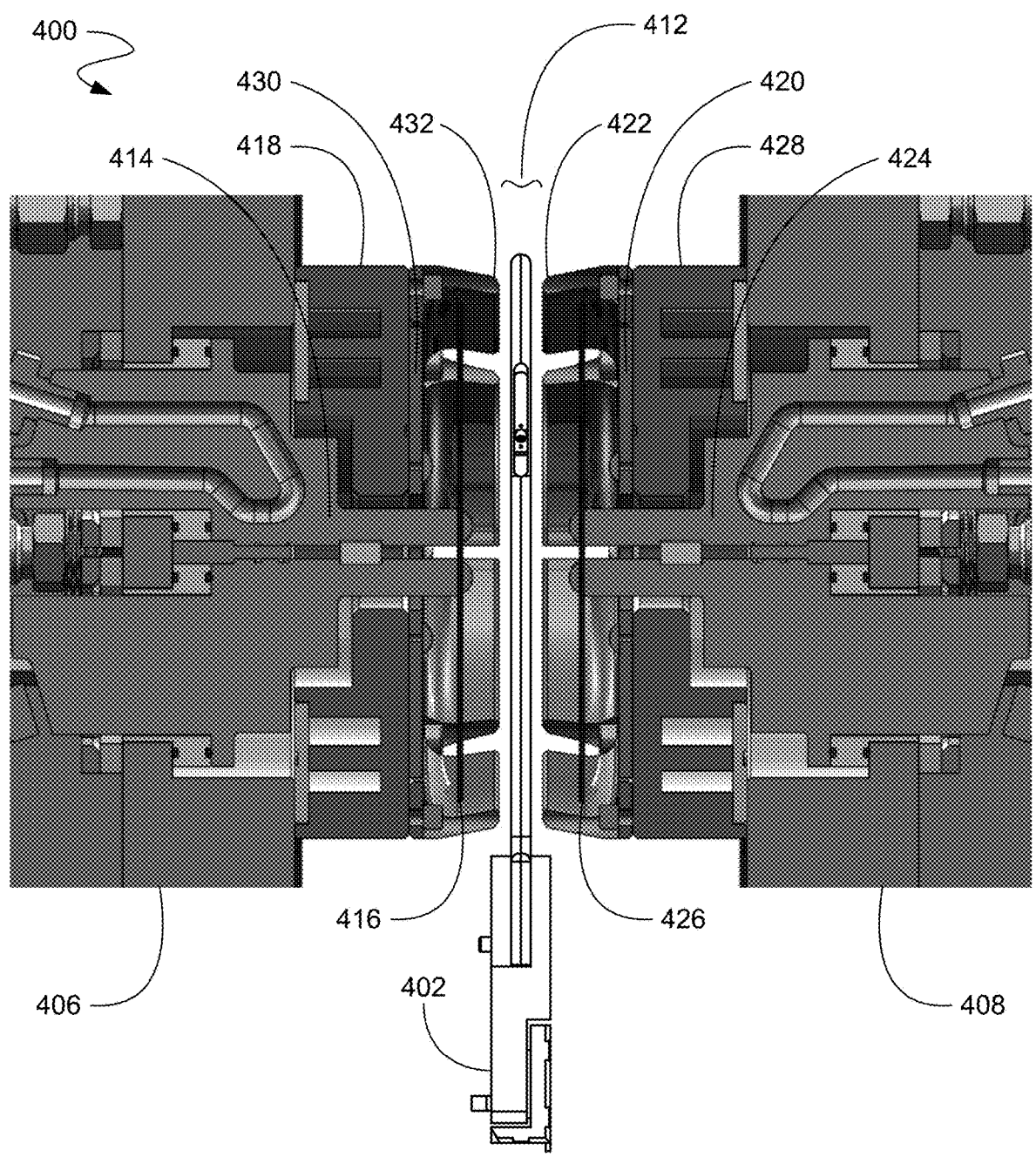

Referring now to FIGS. 4A and 4B, a system 400 including a carrier 402 for positioning a workpiece 404 between a first heater 406 and a second heater 408 is shown according to one aspect of the present embodiments. The carrier 402 secures the workpiece 404 (e.g. substrate) with securing devices 410 (e.g. clips). The carrier 402 is configured to move the workpiece 404 into a gap 412 between the first heater 406 and the second heater 408.

The first heater 406 and the second heater 408 include the elements previously discussed above. For example, the first heater 406 includes at least a first electrode 414, a first heating element 416, a first heat sink 418, a first back plane mirror 420, and a first aperture reflector 422. The second heater 408 includes at least a second electrode 424, a second heating element 426, a second heat sink 428, a second back plane mirror 430, and a second aperture reflector 432. It is understood that further components may also be present, but are not discussed for clarity of illustration.

The carrier 402 positions the workpiece 404 in the gap 412 such that the first aperture reflector 422 is positioned to direct heat from the first heating element 416 onto a first side of the workpiece 404. In addition, the second aperture reflector 432 is positioned to direct heat from the second heating element 426 onto a second side of the workpiece 404. Therefore, both sides of the workpiece 404 may be heated at the same time. After both sides of the workpiece 404 have reached a target temperature (e.g. 500 degrees Celsius or more) the carrier 402 moves the workpiece 404 out of the gap 412 and on to further processing.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
   an electrode;
   a first channel segment within the electrode;
   a second channel segment within the electrode, wherein the second channel segment is parallel to the first channel segment;
   a third channel segment within the electrode, wherein the third channel segment connects the first channel segment and the second channel segment, and
   the third channel segment includes a continuously smooth radial bend; and
   a heating element attached to the electrode.

2. The apparatus of claim 1, wherein the first channel segment, the second channel segment, and the third channel segment include a continuous uniform diameter.

3. The apparatus of claim 1, wherein a surface roughness of the first channel segment, the second channel segment, and the third channel segment is 200-400 micro inches roughness average.

4. The apparatus of claim 1, wherein the first channel segment, the second channel segment, and the third channel segment are adapted to support a flow rate of at least 10 liters per minute.

5. The apparatus of claim 1, wherein the first channel segment, the second channel segment, and the third channel segment include a continuously smooth surface without a weld or a seam.

6. The apparatus of claim 1, further comprising a fluid within the first channel segment, the second channel segment and the third channel segment, wherein the fluid has a pressure that is up to 100 pounds per square inch.

7. The apparatus of claim 1, wherein the electrode is configured to conduct at least 50 amps.

8. An apparatus comprising:
a electrode;
a channel within the electrode, wherein
the channel includes a first segment, a second segment parallel to the first segment, and a plurality of smooth bends between the first segment and the second segment, the channel having a curved sidewall and a rounded cross section; and
a heating element attached to the electrode.

9. The apparatus of claim 8, wherein the channel includes a continuously smooth surface without a weld or a seam.

10. The apparatus of claim 8, wherein a surface roughness of the channel is 200-400 micro inches roughness average.

11. The apparatus of claim 8, wherein the channel is adapted to support a flow rate of at least 10 liters per minute.

12. The apparatus of claim 8, further comprising a fluid within the channel, wherein the fluid has a pressure that is up to 100 pounds per square inch.

13. The apparatus of claim 8, wherein the electrode is configured to conduct at least 50 amps.

14. The apparatus of claim 8, wherein the electrode is formed by direct metal printing to form a continuous surface in the channel.

15. A method comprising:
forming a channel within an electrode, the channel including a first channel segment parallel to a second channel segment, the first channel segment and the second channel segment being separated by a third channel segment including a continuously smooth radial bend; and
attaching a heating element to the electrode.

16. The method of claim 15, wherein the channel includes a continuously smooth surface without a weld or a seam.

17. The method of claim 15, wherein a surface roughness of the channel is 200-400 micro inches roughness average.

18. The method of claim 15, wherein the channel is adapted to support a flow rate of at least 10 liters per minute.

19. The method of claim 15, further comprising:
filling the channel with a fluid, wherein the fluid has a pressure that is up to 100 pounds per square inch.

20. The method of claim 15, wherein the electrode is configured to conduct at least 50 amps.

21. The method of claim 15, wherein the electrode is formed by direct metal printing to form a continuous surface in the channel.

* * * * *